United States Patent [19]

Boody

[11] Patent Number: 4,580,602

[45] Date of Patent: Apr. 8, 1986

[54] FLUID CONTROL VALVE

[75] Inventor: Lawrence D. Boody, Oak Ridge, Tenn.

[73] Assignee: Acraloc, Inc., Oak Ridge, Tenn.

[21] Appl. No.: 558,108

[22] Filed: Dec. 5, 1983

[51] Int. Cl.[4] .................... F16K 11/085; F16K 11/20; F16K 31/122; F16K 31/16

[52] U.S. Cl. ............................ 137/625.17; 137/636.4; 251/58; 251/63

[58] Field of Search ........... 137/625.17, 636.4, 625.48, 137/625.47; 251/368, 58

[56] References Cited

U.S. PATENT DOCUMENTS

| | | | |
|---|---|---|---|
| 2,949,971 | 8/1960 | Cline | 137/625.17 X |
| 2,953,164 | 9/1960 | Haberland et al. | 137/625.17 X |
| 3,104,592 | 9/1963 | Sheesley | 251/58 X |
| 3,269,412 | 8/1966 | Badke | 137/625.17 |
| 3,527,256 | 9/1970 | Colombo | 137/625.48 |
| 3,590,874 | 7/1971 | Rice | 137/625.48 |
| 3,598,145 | 8/1971 | Wolfson | 251/368 X |
| 3,819,149 | 6/1974 | Kinder | 251/368 X |
| 3,941,223 | 2/1976 | Murakami | 137/625.17 |
| 4,355,566 | 11/1982 | Kaji | 251/58 X |

FOREIGN PATENT DOCUMENTS 1554712  11/1979  United Kingdom ........... 137/625.47

Primary Examiner—Martin P. Schwadron
Assistant Examiner—John S. Starsiak, Jr.
Attorney, Agent, or Firm—Pitts and Brittian

[57] ABSTRACT

An improved control valve (20) for selectively connecting one or more inlet ports with one or more outlet ports to establish fluid communication there between is provided. This control valve (20) includes a housing (26) having a wall which defines at least one inlet port and at least one outlet port. A moveable rotor (25) is positioned within a chamber (30) defined within the housing (26). This rotor (25) includes at least one groove (33) having a configuration such that fluid communication can be established between a selected inlet port and a selected outlet port upon movement of the rotor groove (33) into alignment with the ports between which fluid communication is desired. Means are provided for driving or moving the rotor to the desired positions for establishing fluid communication between selected ports.

4 Claims, 9 Drawing Figures

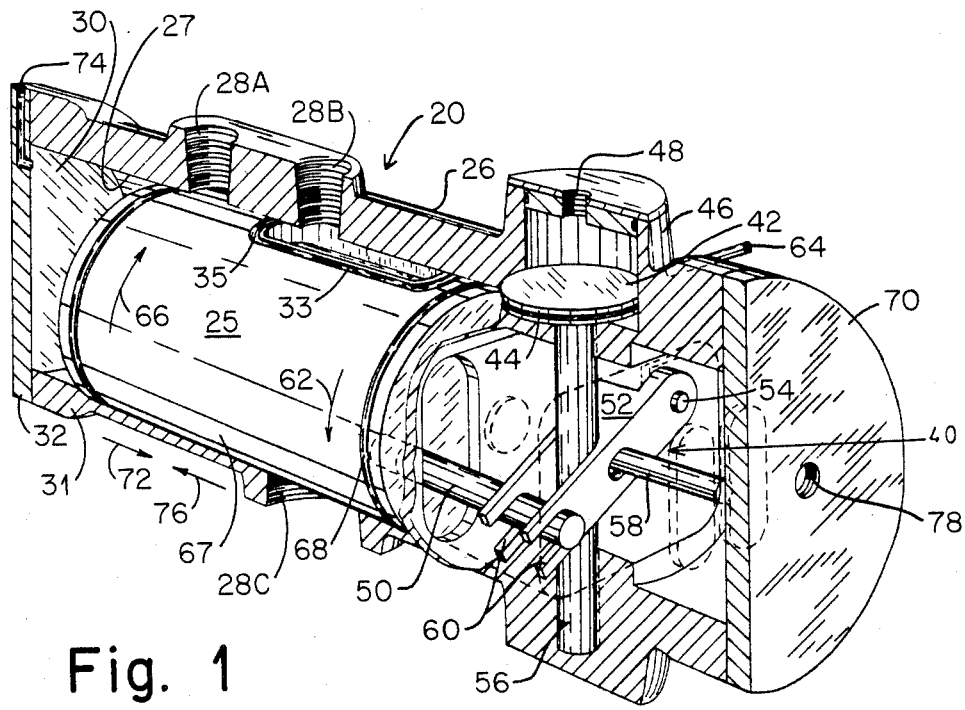
Fig. 1
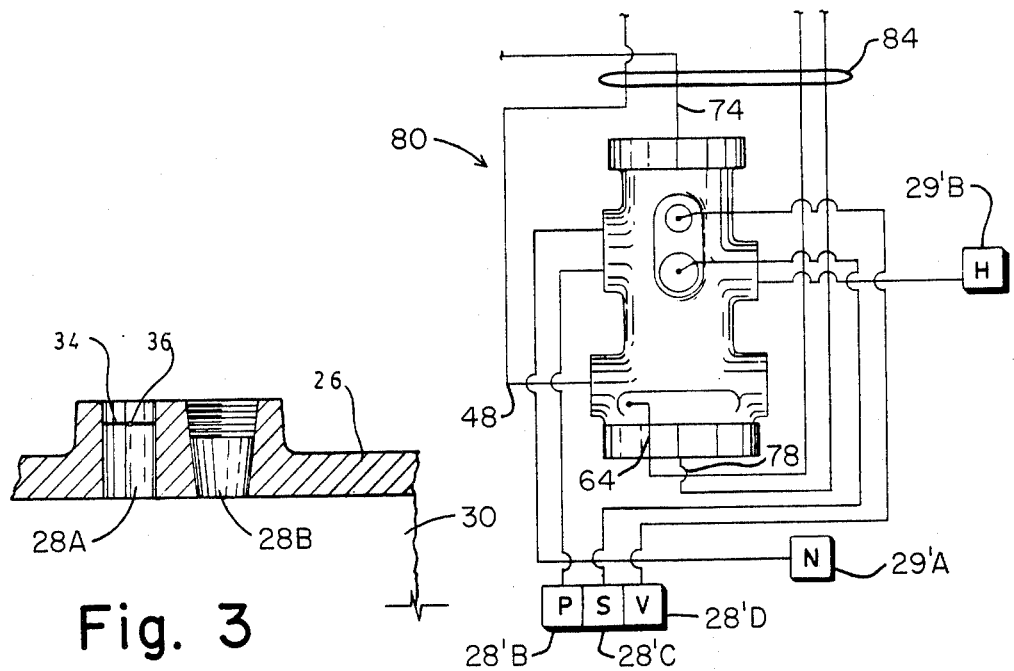
Fig. 2
Fig. 3

FLUID CONTROL VALVE

DESCRIPTION

1. Technical Field

This invention relates to control valves and more particularly concerns a fluid control valve in which predetermined input ports can be selectively connected to predetermined output ports for providing fluid communication there between. The valve is suitable for a number of applications and finds particular utility in controlling the various operational modes in hydraulic and pneumatic systems.

2. Background Art

Fluid control valves of various types have heretofor been known. Generally, such valves provide fluid communication between a selected input port and selected output ports to perform the various functions of the machines or equipment incorporating such valves. Often, the valving is accomplished by a pivoting flapper or a ball and seat arrangement. While these arrangements are satisfactory for certain valving operations, fluid control systems requiring complex valving connections or alternate valving connections can become cumbersome and expensive using conventional valving techniques.

Accordingly, it an object of the present invention to provide an improved fluid control valve which is particularly suitable in hydraulic and pneumatic systems. The valve is designed to be relatively inexpensive to manufacture and easy to maintain.

A further object of the present invention is to provide a control valve which can accomplish the connection of a preselected input port or ports with a preselected output port or ports in various combinations.

Yet another object of the present invention is to provide such a control valve which can be easily adapted to perform special purpose connections between inlet and outlet ports.

BRIEF DESCRIPTION OF THE DRAWINGS

Other objects and advantages of the present invention will become apparent upon reading the detailed description together with the drawings described as follows:

FIG. 1 illustrates a partially sectional perspective view of a control valve incorporating various features of the present invention together with an exemplary drive means for positioning the valve rotor.

FIG. 2 illustrates an exemplary connection of the valve illustrated in FIG. 1 in a system having various functions controlled by this valve.

FIG. 3 illustrates an alternate embodiment of a port of the system which itself can be selectively opened and closed to further accomplish desired operational modes.

DISCLOSURE OF THE INVENTION

Figure 4A:
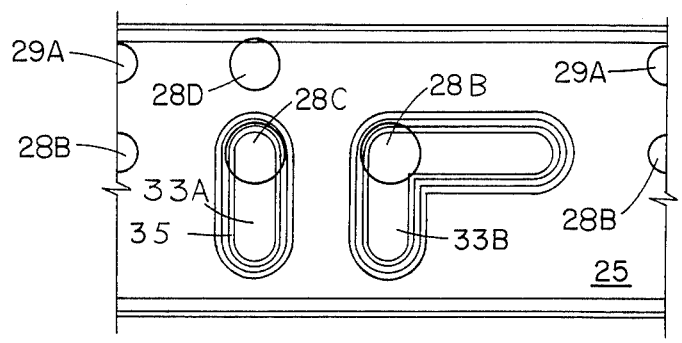
FIGS. 4A-D illustrate the various positions of the valve ports which are joined by the registering grooves in the rotor to accomplish exemplary valve functions. These positions are established by shifting the rotor axially and rotationally, in the illustrated embodiment, with respect to the housing to place the selective grooves in registration with selective input and output ports to selectively establish fluid communication between ports or to seal the ports as is desired.
Figure 4B:
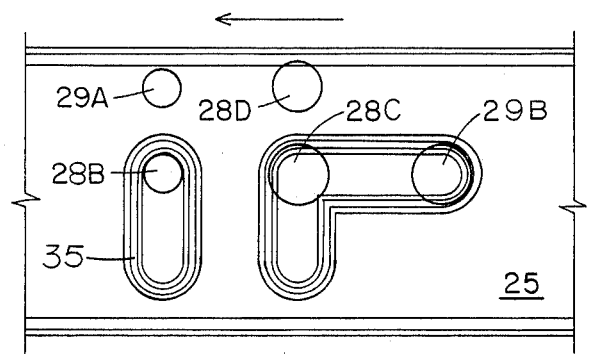
Figure 4C:
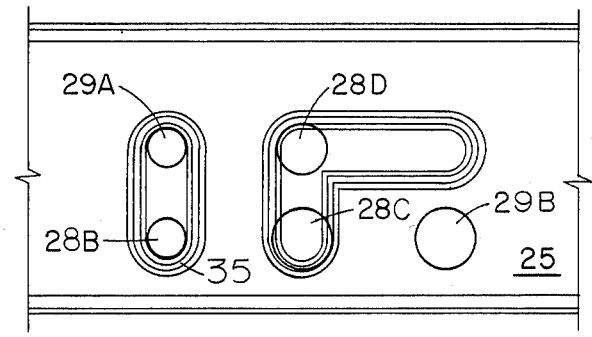
Figure 4D:
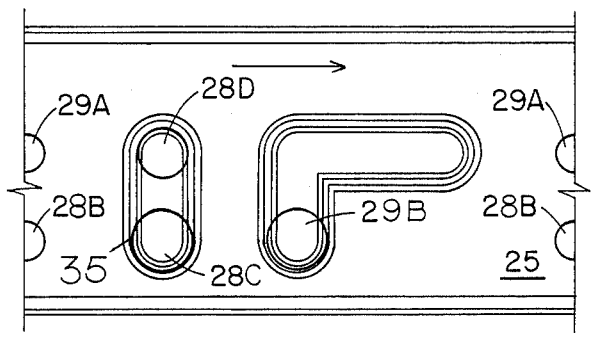

In accordance with the various features of the invention, a control valve for controlling various functions is provided. The valve selectively connects at least one inlet port with at least one outlet port to effect and establish fluid communication between such ports. The valve includes a housing which defines at least one inlet port and at least one outlet port which open into a chamber defined within this housing. This chamber receives a rotor movable within the chamber. The rotor forms a seal with the chamber wall and includes at least one groove shaped for connecting in fluid communication at least one inlet port with at least one outlet port to establish fluid communication between such ports upon movement of the rotor to a selected position. The rotor is moved by suitable drive means which serves to position the rotor grooves at locations for establishing fluid communication or for sealing the ports as is desired.

BEST MODE FOR CARRYING OUT THE INVENTION

Referring now to the drawings, a control valve constructed in accordance with various features of the present invention is illustrated generally at 20 in FIG. 1. This control valve is particulary suitable for selectively connecting one or more inlet ports with one or more outlet ports to establish fluid communication between the connected ports for accomplishing desired operations. The valve 20 includes a housing 26 having a wall which defines an exterior surface 27. A plurality of ports generally indicated at 28 are defined in the housing 26. These ports are selectively connected as will be described in greater detail hereinafter by the valve 20. As is necessary or desired, a single inlet port can be connected with a plurality of outlet ports, a single outlet port can be connected with a plurality of inlet ports, or a plurality of inlet ports can be selectively connected with a plurality of outlet ports. As will become apparent from the discussion below, the ability of the valve 20 to selectively connect a single or plurality of inlet ports with a single or plurality of outlet ports allows the valve to perform various selected fluid communication functions simultaneously and/or in a selected sequence while terminating fluid communications that are incompatible with the simultaneous or sequential functions desired.

As shown in FIG. 1, a rotor 25 is received within the chamber 30 defined within the housing. In the illustrated embodiment, this chamber 30 is substantially cylindrical in configuration and is closed at end portion 31 of the housing by a suitable closure plate 32. The rotor 25 is movable within the chamber 30. In the embodiment depicted in FIG. 1, this rotor 25 can be rotated about its axis within the chamber and moved longitudinally along the chamber axis for positioning the rotor at preselected locations to accomplish the establishment of fluid communication between desired ports. Accordingly, the outer surface of the rotor 25 and the contacting chamber wall are preferably constructed of a material having self-lubricating properties, known in the art, such as a teflon impregnated substance or other similar friction reducing lubricant.

To this end, the rotor 25 is provided with a groove 33 having a preselected configuration. This groove 33 is defined within the stock of the rotor 25 and preferably carries about its perimeter, a seal member 35 which serves to form a seal between the rotor and the internal surface of the chamber wall. As is necessary or desired, a plurality of grooves can be defined within the rotor 25. A sample operation of a valve control member incorporating a plurality of grooves and a plurality of inlet openings will be described hereinafter in connection with the operation of the valve.

Means are provided for moving or shifting the valve such that the grooves 33 register with selected ports 28 for providing fluid communication there between. In the embodiment illustrated in FIG. 1, such means include rotational drive means generally indicated at 40 and longitudinal drive means which will be described in greater detail hereinafter. In FIG. 1, the rotational drive means which serves to rotate the rotor 25 for proper alignment or connection of the various ports is accomplished by movement of the piston 42. More specifically, this piston 42 includes a substantially cylindrical head 44 which is slideably received within a cylinder 46 defined by the housing 26. Upon the introduction of a fluid such as air through port 48, this piston 42 is moved downwardly to the position illustrated in FIG. 1. As shown, the piston 42 is drivingly connected to the rotor 25 through a rotor arm 50. More specifically, a clevis shaped fork 52 is pivotally mounted on the wall of the housing by the pivot pin 54 as illustrated in FIG. 1. The piston rod 56 is connected to the fork 52 through the connector rod 58 such that downward movement of the piston 42 imparts a rotational movement to the rotor 25 since the fork 52 interconnects with this rotor arm by means of the slotted grooves 60 at the outboard end portions of the fork 52. Thus, upon injection of a fluid such as pressurized air through the port 48 into the cylinder 46, the piston 42 is driven downwardly to the position illustrated in FIG. 1 and the rotor is rotated in the direction of the arrow 62. Similarly, the piston 42 can be driven upwardly with respect to its position in FIG. 1 by injection of air into the port 64 which opens proximate the underside of the piston head 44. Thus, the rotor can be driven in the direction of the arrow 66 by injection of a pressurized fluid such as air into the port 64 which forces the piston 42 upwardly thereby imparting this rotation. As will be described in greater detail in connection with FIGS. 4A–D, this rotational movement of the rotor assists in aligning the grooves 33 with selected ports between which fluid communication is desired.

Means are also provided for moving the rotor 25 longitudinally along its axis within the cylinder or chamber 30. In this connection, the rotor is provided at its opposite end portions 67 and 68, respectively, with suitable O-ring seals or the like such that the rotor forms a hermetically sealed chamber between the end portion 67 and the end plate 32 and the end portion 68 and the end plate 70. In order to shift the piston in the direction of the arrow 72, a fluid such as pressurized air is injected through the port 74 in the end plate 32. This injection of air forces the rotor in the direction of the arrow 72 to assist in aligning the groove at a desired location. Similarly, the rotor can be moved longitudinally, that is along its axis, in the direction of the arrow 76 by injecting a pressurized fluid through the port 78 in the end plate 70. Air injected through the port 78 engages the head portion of the rotor proximate the end portion 68 of such rotor. It will be noted that the pressurized air is allowed to contact the head of the rotor proximate the end portion 68 thereof through the elongated opening through which the rotor arm 50 extends through the housing. Thus, the rotor 25 can be rotated in the direction of the arrow 62 by injection of a pressurized fluid through the port 48. The rotor can be rotated in the direction of the arrow 66 by injection of a pressurized fluid through the port 64. The rotor can be driven longitudinally in the direction of the arrow 72 by the injection of a pressurized fluid through the port 74, and similarly, the rotor can be driven in a direction of the arrow 76 by the injection of a pressurized fluid through the port 78.

FIG. 3 illustrates a port system that can be utilized with the present fluid control valve. For example port 28A (see FIG. 1) can be a vent for some equipment connected to port 28B. However, when the rotor (not shown in this figure) moves axially or rotationally to connect channels therein to, for example a vacuum system, it would be undesirable for ambient air to be drawn in through port 28A. For such applications a conventional butterfly valve 34 is positioned in vent port 28A. This butterfly valve 34 can be operated by differential pressure or by means connected to its pivot rod 36.

A sample connection of the control valve 20 in a system incorporating various operational modes is shown in FIG. 2. In this system, generally indicated at 80 in FIG. 2, the inlet ports connect through suitable and illustrated conduits with suitable supplies 28'B, C, and D, which could for example serve as the primary, secondary and vent of a vacumn supply. These supplies could be selectively connected through the valve with outlet ports which are connected in fluid communication with suitable mechanical apparatus such as a hood 29'B and a nozzle 29'A. Thus, by positioning the rotor at a desired location and incorporating within the rotor suitable grooves, the supplies 28'B–D can be selectively connected singularly or in predetermined combinations with the mechanisms which are desired to be supplied through the outlet ports. The actual longitudinal and rotational movement of the rotor will be accomplished through the lines 84 which are connected with the ports 74 and 78 through which the longitudinal movement of the rotor is affected, and the ports 48 and 64 through which the rotational movement of the rotor is affected. As will be recognized, the primed numbers refer to supplies or mechanisms connected through the like numbered references.

FIG. 4 illustrates an example of how the connections can be made by movement of the rotor. In these figures, the rotor 25 is fanned out or unfolded such that its entire circumference can be viewed in a plan illustration. The rotor is depicted as having a pair of spaced grooves 33A and 33B. It will be noted that groove 33A is substantially elongated and groove 33B is L-shaped. Suitable sealing means are depicted at the opposite end portions of the rotor 25 and around the perimeter of the grooves 33A and 33B. It should be recognized that these seal means form a seal with the internal surface of the wall defining the chamber 30 within which the rotor moves.

In FIG. 4A, each of the inlet ports and outlet ports are sealed from each other. Upon movement of the rotor in a rotational direction approximately 90 degrees as in FIG. 4B as can be accomplished by the means 40 illustrated in FIG. 1, the inlet port depicted by 28C is connected to the outlet port 29B through the groove 33B. The balance of the inlet ports and outlet ports are sealed or prevented from forming fluid communication with other ports. Upon movement of the rotor in the direction of the arrow illustrated proximate to FIG. 4C, the inlet port 28B is connected with the outlet port 29A and the inlet port 28C is connected with the outlet port 28D. The inlet port 29B is sealed. Upon rotation of the rotor from the position indicated in FIG. 4C in the direction of the arrow proximate FIG. 4D, the inlet port 28C is connected with the outlet port 28D and the balance of the ports are sealed.

Thus, a complex array of inlet and outlet ports connections can be readily established by varying the shape of the grooves 33, the position of the grooves, and/or the position of the ports connected thereby. Since the rotor forms a seal proximate the perimeter of the grooves with the internal surface of the wall of the housing defining the chamber 30, the grooves 33 simply provide pathways between the ports desired to be connected upon proper registry between the ports and the grooves. Thus, it will be appreciated that by providing the valve 20 with multiple inlet and outlet ports, the valve may selectively perform several fluid communication functions simultaneously, and/or perform a selected sequence of fluid communication functions, the sequence being determined by the selective movement and positioning of the rotor 25 within the housing 26.

Figure 5A:
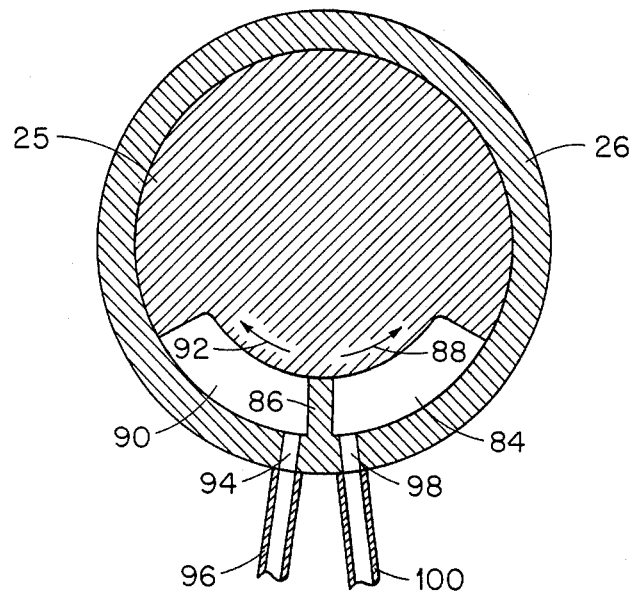
FIGS. 5A and 5B illustrate different views of alternate means suitable for accomplishing the rotational and/or axial shifting of the valve rotor.

An alternate embodiment for affecting rotation of the rotor 25 with respect to the housing 26 is illustrated diagrammatically in FIG. 5A. More specifically, upon injection of pressurized fluid into the chamber 84 defined between the housing tab 86 and the illustrated groove in the rotor wall, rotation of the rotor 25 is imparted in the direction of the arrow 88. Similarly, upon injection of pressurized fluid through the port 30 illustrated opening into the chamber 90, rotation of the rotor is imparted in the direction of the arrow 92. As shown, port 94 provides fluid communication from a suitable supply fed through the conduit 96 with the chamber 90 and port 98 provides fluid communication through the conduit 100 with the chamber 84.

Figure 5B:
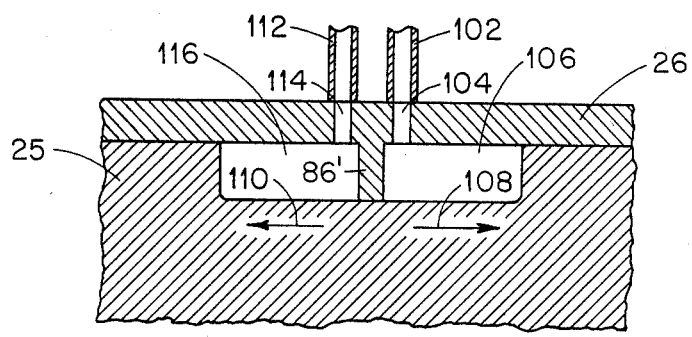

In a similar manner, as shown in FIG. 5B longitudinal movement of the rotor 25 with respect to the housing 26 can be affected by the introduction of the pressurized fluid through the conduit 102, and the port 104 which communicates with the chamber 106. Introduction of pressurized fluid into this chamber 106, will impart a longitudinal motion in the direction of the arrow 108. Similarly, motion of the rotor 25 can be imparted in the direction of the arrow 110 by the introduction of pressurized fluid through the conduit 112, the port 114 and into the chamber 116. It will be noted that in both FIGS. 5A and 5B, the tab 86 and 86', respectively, are carried by the housing and forms a suitable seal at its outboard end portion with the groove which defines the chambers operatively associated with this tab.

While a preferred embodiment has been shown and described, it will be understood that there is no intent to limit the invention by such disclosure, but rather it is intended to cover all modifications and alternate constructions falling within the spirit and scope of the invention as defined in the appended claims.

I claim:

1. An improved control valve for selectively connecting at least one inlet port with at least one outlet port to effect fluid communication therebetween, which comprises:

an elongated housing including a wall having an external surface, said housing being provided with a cylindrical chamber defining an internal surface of said housing, said wall being provided with at least one inlet port and at least one outlet port extending from said external surface to said internal surface at selected positions in said housing, at least one of said outlet ports being disposed axially and circumferentially from at least one of said inlet ports;

a cylindrical rotor movable both axially and rotationally within said chamber and forming a seal with said internal surface of said housing, said rotor being provided with at least a first and a second surface groove extending a selected portion of the circumference of said rotor and at least a third surface groove extending axially along a selected portion of said rotor and intersecting one of said first and second grooves, the spacing and length of said grooves selected whereby at least one of said grooves connects at least one of said inlet ports to at least one of said outlet ports when said rotor is moved to a selected axial and rotational position;

means for moving said rotor axially within said chamber which comprises means for admitting pneumatic pressure into said chamber at a selected end of said rotor to cause said rotor to be moved away from said selected end; and means for rotating said rotor about its axis which comprises a rod extending from a selected end of said rotor in a direction parallel to said rotor axis but displaced from said axis, a clevis-shaped fork engaged with said rod substantially perpendicular with said axis of said rotor, a piston mounted for reciprocable motion within a cylinder provided within said wall of said enclosure, a piston rod connected between said piston and said fork, and a source of pneumatic pressure connected to said cylinder to reciprocate said piston and thereby rotate said rotor about said axis of said rotor.

2. The improved control valve of claim 1 wherein said wall of said housing is provided with a plurality of inlet ports and outlet ports extending from said external surface to said internal surface at selected positions in said housing, and said rotor is provided with a plurality of said grooves whereby upon selected axial and rotational positioning of said rotor a plurality of said grooves register with a selected number of said inlet ports and said outlet ports for selectively providing simultaneous fluid communication between said inlet and outlet ports in register with said grooves.

3. The improved control valve of claim 1 wherein each of said grooves is provided with a seal member about the periphery thereof, said seal member preventing communication between inlet and outlet ports not connected by said grooves, and inlet and outlet ports connected by said grooves.

4. The improved control valve of claim 1 wherein said internal surface of said housing and the external surface of said rotor are characterized by a low coefficient of friction whereby said rotor is readily reciprocated and rotated within said chamber.

* * * * *